United States Patent
Si et al.

(10) Patent No.: US 8,861,133 B1
(45) Date of Patent: Oct. 14, 2014

(54) METHOD AND SYSTEM FOR PROVIDING A PERPENDICULAR MAGNETIC RECORDING TRANSDUCER USING A LOW ENERGY MILL

(71) Applicant: Western Digital (Fremont), LLC, Fremont, CA (US)

(72) Inventors: Weimin Si, San Ramon, CA (US); Yunfei Li, Fremont, CA (US); Ying Hong, Los Gatos, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/894,240

(22) Filed: May 14, 2013

Related U.S. Application Data (62) Division of application No. 12/777,609, filed on May 11, 2010, now Pat. No. 8,458,892.

(51) Int. Cl.
*G11B 5/187* (2006.01)
*G11B 5/127* (2006.01)

(52) U.S. Cl.
CPC .................................. *G11B 5/1272* (2013.01)
USPC ..................................................... 360/125.03

(58) Field of Classification Search
USPC ............... 360/125.03, 125.3, 125.31, 125.11, 360/125.15; 29/603.12, 603.13, 603.15, 29/603.16, 603.18
See application file for complete search history.

(56) References Cited

U.S. PATENT DOCUMENTS

| | | | |
|---|---|---|---|
| 5,726,841 A | 3/1998 | Tong et al. | |
| 6,967,168 B2 | 11/2005 | Stearns et al. | |
| 7,100,266 B2 | 9/2006 | Plumer et al. | |
| 7,159,302 B2 | 1/2007 | Feldbaum et al. | |
| 7,296,338 B2 | 11/2007 | Le et al. | |
| 7,394,621 B2 | 7/2008 | Li et al. | |
| 8,493,693 B1 * | 7/2013 | Zheng et al. | 360/324.11 |
| 8,582,253 B1 * | 11/2013 | Zheng et al. | 360/324.2 |
| 2006/0268456 A1 | 11/2006 | Sasaki et al. | |
| 2007/0258167 A1 | 11/2007 | Allen et al. | |
| 2009/0059426 A1 | 3/2009 | Sasaki et al. | |
| 2014/0104724 A1 * | 4/2014 | Shiroishi et al. | 360/75 |

FOREIGN PATENT DOCUMENTS

JP   2000011320 A   1/2000

OTHER PUBLICATIONS

Office Action dated Jul. 31, 2012 from U.S. Appl. No. 12/777,609, 10 pages.
Office Action dated Feb. 20, 2013 from U.S. Appl. No. 12/777,609, 7 pages.

* cited by examiner

*Primary Examiner* — Allen T Cao (57) ABSTRACT

A method and system for fabricating magnetic transducer are described. The method and system include providing a main pole having a bottom and a top wider than the bottom. The method and system further include performing a high energy ion mill at an angle from a normal to the top of the main pole and at a first energy. The high energy ion mill removes a portion of the top of the main pole and exposes a top bevel surface for the main pole. The method and system also include performing a low energy ion mill at second energy and a glancing angle from the top bevel surface. The glancing angle is not more than fifteen degrees. The second energy is less than the first energy. The method and system also include depositing a nonmagnetic gap.

3 Claims, 8 Drawing Sheets

METHOD AND SYSTEM FOR PROVIDING A PERPENDICULAR MAGNETIC RECORDING TRANSDUCER USING A LOW ENERGY MILL

CROSS-REFERENCE TO RELATED APPLICATIONS

This application is a divisional of U.S. patent application Ser. No. 12/777,609, filed May 11, 2010, entitled METHOD AND SYSTEM FOR PROVIDING A PERPENDICULAR MAGNETIC RECORDING TRANSDUCER USING A LOW ENERGY ION MILL, assigned to the assignee of the present application, and incorporated herein by reference.

BACKGROUND

Figure 1:
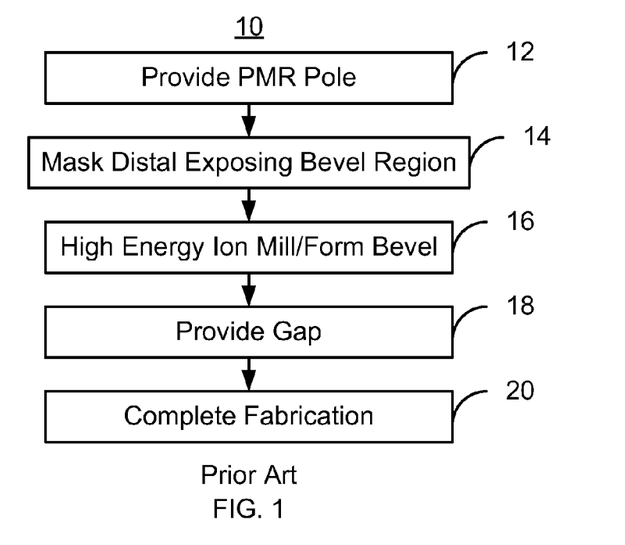
FIG. 1 is a flow chart depicting a conventional method for fabricating a PMR transducer.

FIG. 1 is a flow chart depicting a conventional method 10 for fabricating a conventional perpendicular magnetic recording (PMR) transducer. For simplicity, some steps are omitted. A conventional pole is provided, via step 12. The conventional pole is magnetic and has a top wider than its bottom. Step 12 typically includes depositing on or more high moment magnetic layers in the desired shape. For example, materials containing Co, Fe, and/or Ni with a high moment may be deposited in a trench having the desired trapezoidal profile or blanket deposited and subjected to a photolithographic process to provide the desired trapezoidal profile. In addition, the conventional pole is desired to have at least a trailing edge, or top, bevel. Thus, the conventional pole is desired to be shorter in the region of the air-bearing surface (ABS) location. The ABS location is the location at which the ABS will reside in the completed structure. In addition to the trailing edge bevel, the conventional pole may include a leading edge bevel.

To form the bevel, a mask is provided, via step 14. Step 14 may include providing bottom antireflective coating (BARC) and other layers as well as depositing and patterning a hard mask or other mask for bevel formation. A high energy ion mill is performed, via step 16. The ion mill is typically performed at an angle from normal to the surface to provide a sloped trailing edge bevel. The energy of the ion mill is typically seven hundred eV or greater. A high energy ion mill is desired in order to remove the pole material at a sufficiently high rate for the desired throughput in manufacturing processes. For example, the high energy ion mill may remove on the order of 1600-2000 Angstroms in a few minutes.

A conventional gap layer is provided, via step 18. Step 18 may include a brief sputter etch followed by deposition of the conventional gap layer. The conventional gap layer is nonmagnetic and may be insulating. The conventional gap layer is typically alumina deposited using atomic layer deposition (ALD). As a result, the conventional gap is conformal, covering the top and side of the conventional PMR pole.

Fabrication of the transducer is then completed, via step 20. For example, a wrap-around shield, coils, other shield(s) and other structures may be fabricated. In addition, the transducer is lapped to expose the ABS.

Figure 2:
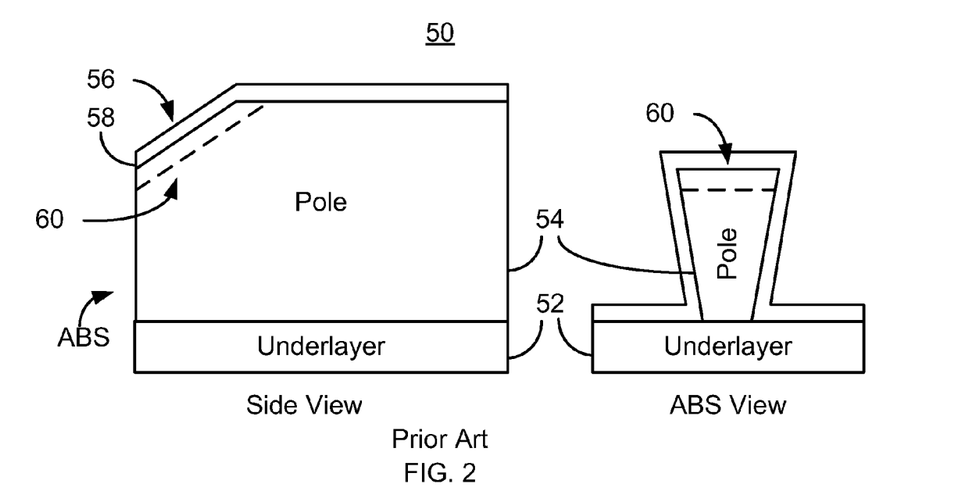
FIG. 2 is a diagram depicting a conventional PMR transducer.

FIG. 2 depicts a portion of a conventional PMR transducer 50 formed using the conventional method 10. The conventional transducer 50 includes an underlayer 52, a conventional pole 54 including trailing bevel 56, and a conventional gap 58. Other structures (not shown) are also fabricated using the conventional method 10.

Although the conventional method 10 may provide the conventional PMR transducer 50, there may be drawbacks. In particular, the top layer of the pole may be damaged. As can be seen in FIG. 2, the pole 56 includes a damaged region 60. This region is generally amorphous instead of crystalline. The amorphous damaged region 60 has a lower saturation magnetic flux density ($B_s$) and lowers the overall $B_s$ of the conventional pole 54. A reduction in the $B_s$ of the pole is undesirable. Further, the damaged region 60 may result in the effective thickness of the gap 58 varying. Such a variation in the nonmagnetic gap 58 thickness is undesirable. Accordingly, what is needed is an improved method for fabricating a transducer.

SUMMARY

A method and system for fabricating magnetic transducer are described. The method and system include providing a main pole having a bottom and a top wider than the bottom. The method and system further include performing a high energy ion mill at an angle from a normal to the top of the main pole and at a first energy. The high energy ion mill removes a portion of the top of the main pole and exposes a top bevel surface for the main pole. The method and system also include performing a low energy ion mill at second energy and a glancing angle from the top bevel surface. The glancing angle is not more than fifteen degrees. The second energy is less than the first energy. The method and system also include depositing a nonmagnetic gap.

DETAILED DESCRIPTION OF THE PREFERRED EMBODIMENTS

Figure 3:
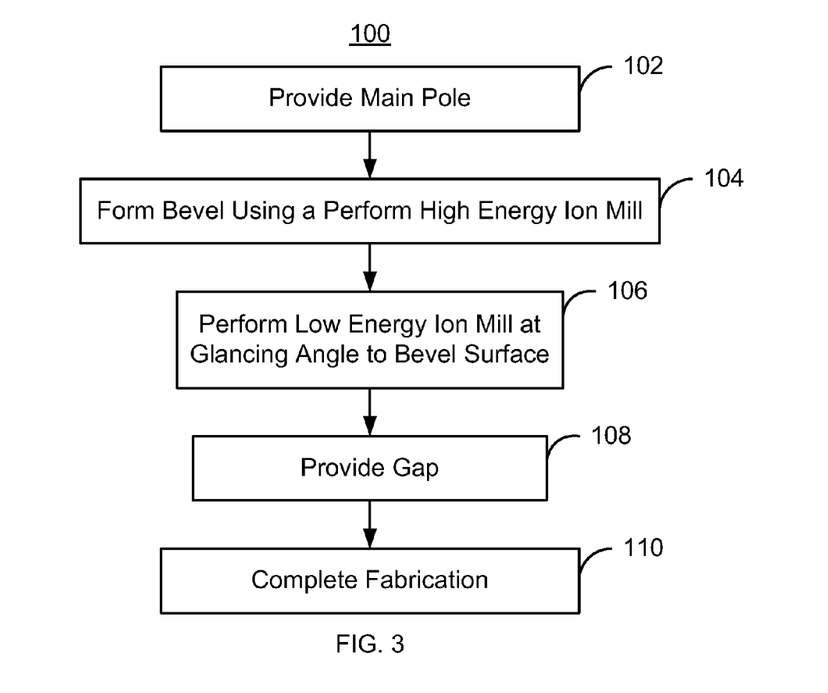
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a main pole and its associated structures in a single magnetic recording transducer. However, the method 100 may be used to fabricate multiple structures and/or multiple transducers at substantially the same time. The method 100 and system are also described in the context of particular layers. However, in some embodiments, such layers may include multiple sublayers. In one embodiment, the method 100 commences after formation of the underlayer(s) on which the main pole is to reside.

A main pole is provided, via step 102. The main pole may be a PMR pole. Thus, the top of the main pole may be wider than the bottom. In some embodiments, the main pole provided may have a leading edge, or bottom bevel. Thus, the region of the main pole at the ABS may be shorter than a portion of the main pole distal from the ABS. Step 102 may be performed by depositing a layer, providing a trench having the desired profile in the layer and depositing the material(s) for the pole in the trench. Alternatively, the magnetic and other material(s) for the pole may be deposited and a portion of the material(s) removed to form the pole.

A trailing edge, or top bevel, is formed using a high energy ion mill, via step 104. Step 104 may also including providing a mask exposing the portion of the main pole proximate to the ABS location, then ion milling the exposed portion of the magnetic transducer at a high energy. The energy of an ion mill refers to the energy of the ions being used in the milling process. In some embodiments, the high energy is at least five hundred eV. In some such embodiments, the high energy is at least seven hundred eV. The high energy ion mill is also performed at a nonzero angle to normal to the top surface of the main pole. In some embodiments, this angle is at least thirty-five and not more than fifty five degrees. In other embodiments, the angle may be at least forty and not more than fifty degrees. Further, the angle is such that the high energy ion mill is a back side ion mill. Thus, the ions approach the ABS location from the back side of the transducer. The high energy ion mill removes a portion of the main pole and exposes a top bevel surface of the main pole. The top bevel surface is sloped at a bevel angle with respect to the ABS. The bevel angle is nonzero. Further, the high energy ion mill may provide a milling rate having a sufficiently high removal rate for a desired throughput. For example, the high energy might correspond to removing 1600-2000 Angstroms from the main pole in a few minutes. The high energy ion mill may also include a front side ion mill that is used to clean redeposition from the top bevel surface.

A low energy ion mill is performed, via step 106. In some embodiments, this low energy ion mill is performed after removal of the mask used in the high energy ion mill of step 104. The low energy ion mill is at an energy that is lower than the high energy ion mill. In some embodiments, the low energy ion mill is at an energy at least three hundred eV less than that of the high energy ion mill. For example, in some embodiments, the low energy ion mill may be at an energy of not more than two hundred and fifty eV. In some such embodiments, the low energy ion mill is at an energy of not more than two hundred eV. Further, in some embodiments, the energy of the low energy ion mill is not greater than one hundred eV. In some embodiments, it may be desired to perform the ion mill of step 106 in as low an energy as possible for the tool used while still maintaining a stable ion mill. The low energy ion mill is also provided at a glancing angle from the top bevel surface. In some embodiments, this glancing angle is not more than fifteen degrees. In some such embodiments, the glancing angle is at least ten degrees. In some embodiments, the glancing angle corresponds to an angle with respect to normal to the top surface of the main pole that is approximately the same as the high energy ion mill angle. In some embodiments, however, the glancing angle corresponds to an angle respect to normal to the top surface of the main pole that is different from the high energy ion mill angle. For example, the glancing angle may correspond to an angle with respect to normal to the surface that is greater than the angle of the high energy ion mill.

A nonmagnetic gap covering the main pole is provided, via step 108. At least a portion of the nonmagnetic gap resides on the top of the main pole. In some embodiments, step 108 includes performing a sputter clean to preclean the transducer and then depositing a nonmagnetic layer, such as alumina, using ALD. Because ALD is used, the nonmagnetic gap may be conformally deposited. Thus, the top and sides of the main pole may be covered by the nonmagnetic gap. Further, the nonmagnetic gap may follow the profile of the main pole. However, in other embodiments, other deposition mechanisms, including nonconformal deposition, may be used. In addition, the nonmagnetic gap may cover other structures in the transducer.

Fabrication of the magnetic transducer may then be completed, via step 110. In some embodiments, step 110 includes providing a wrap-around shield proximate to the ABS location. Fabrication of the wrap-around shield may include depositing seed layers for the wrap-around shield, providing a mask for the wrap-around shield, then electroplating the wrap-around shield. Further, insulating layer(s), coil(s), other shield(s) and/or other structures may be fabricated.

Figure 4:
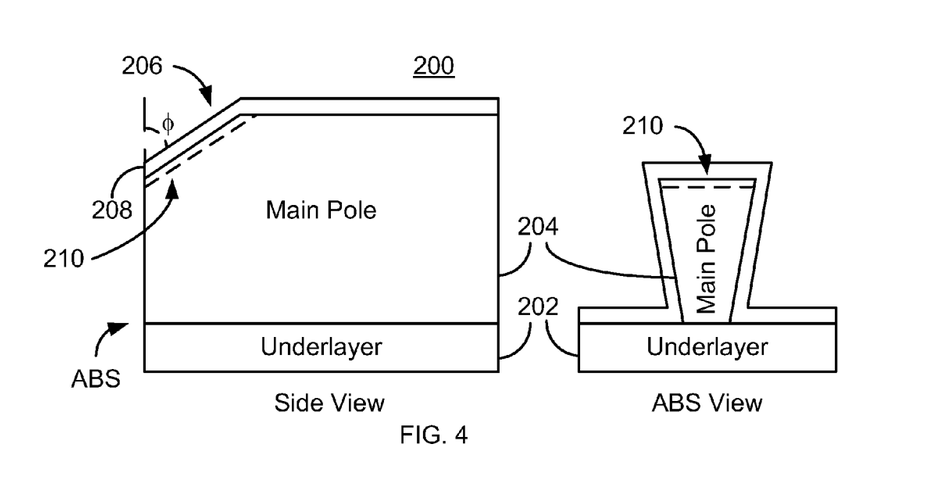
FIG. 4 is a diagram depicting an exemplary embodiment of a PMR transducer.
Figure 5:
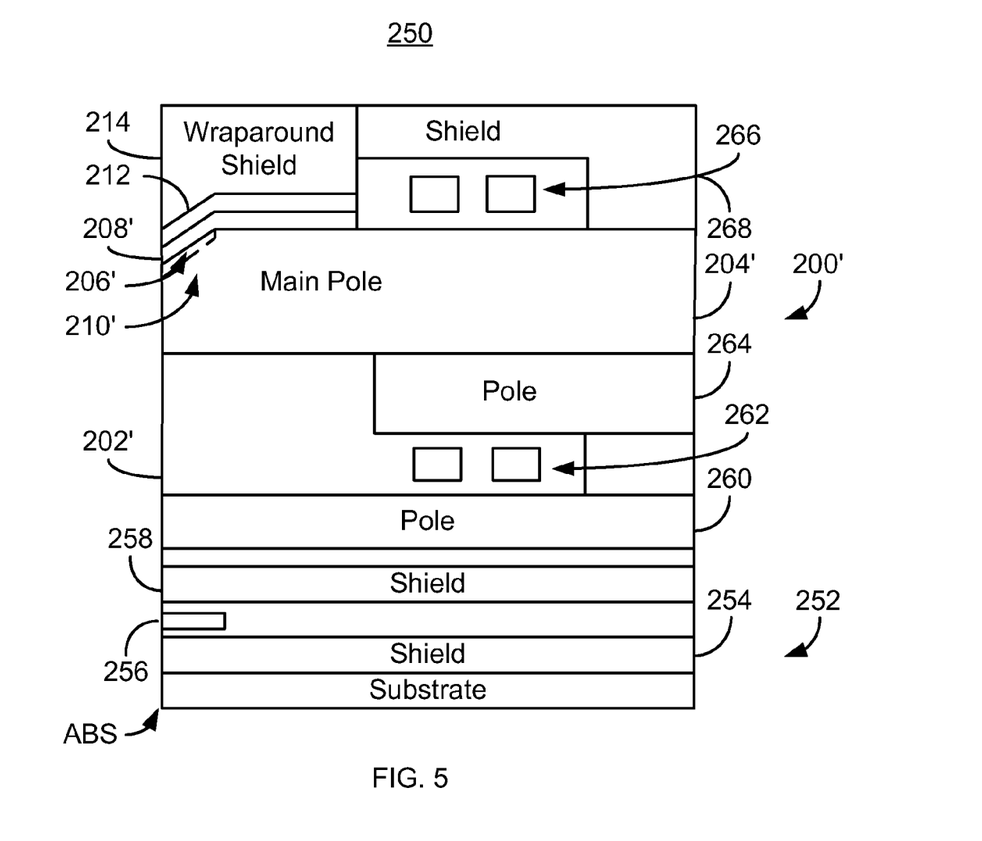
FIG. 5 is a diagram depicting an exemplary embodiment of a PMR head incorporating the PMR transducer.

FIG. 4 is a diagram depicting an exemplary embodiment of a portion of a PMR transducer 200 that may be formed using the method 100. FIG. 5 depicts a head 250 incorporating the transducer 200'. For clarity, FIGS. 4-5 are not to scale. FIG. 4 depicts side and ABS views of the transducer 200, while FIG. 5 depicts a side view only of the head 250. The head 250 shown includes a read transducer 252 and the PMR transducer 200'. However, in another embodiment, the transducer 200/200' may be used in a head including only one or more write transducers 200/200'. The read transducer 252 includes shields 254 and 258 as well as sensor 256. The PMR transducer 200' shown in FIG. 5 includes poles 260 and 264, shield 268, and coils 262 and 266 in addition to the portion of the PMR transducer 200 that is also shown in FIG. 4. The PMR transducer 200/200' includes underlayer 202/202', a main pole 204/204' having a trailing edge bevel 206/206', and gap 208/208'. Also shown in FIG. 5 are a wrap-around shield 214 and the seed layer 212 for the wrap-around shield. Other and/or different components may be fabricated in other embodiments. Although not shown, the pole 204/204' might also include a bottom, or leading edge bevel. However, in some embodiments, the leading edge bevel may be omitted. Also shown is the ABS location in FIG. 4 and the ABS in FIG. 5. For example, in some embodiments, the transducer 200 is lapped to expose the surface of the transducer 200 at the ABS location.

Using the method 100, main pole 204/204' having a trailing edge bevel 206/206' may be formed. Further, the damage 210/210' to the main pole may be reduced. More specifically, the high energy ion mill of step 104 may cause the main pole to be damaged, for example forming an amorphous layer at the top bevel surface 206/206'. Some of the damage 210/210' is removed without causing significant additional damage by the low energy, glancing angle ion mill of step 106. After the low energy ion mill of step 106, the thickness of the damaged region 210/210' may be less than twenty-five Angstroms. For example, the thickness may be on the order of nineteen through twenty-one Angstroms. In some embodiments, the thickness of the damaged region 210/210' is less than twenty Angstroms after the low energy ion mill of step 106. Further, precleaning of the main pole 204/204' prior to deposition of the gap 208/208' may further reduce the damage to the main pole 204/204'. In some embodiments, the thickness of the damaged/amorphous region 210/210' may be less than twenty Angstroms after deposition of the gap 208/208'. In some such embodiments, the thickness of the damaged region 210/210' may be approximately fifteen Angstroms or less. Because the damaged region 210/210' is thinner, reductions in the saturation magnetization of the main pole 204/204' due to the damaged region 210/210' maybe ameliorated. Such a higher saturation magnetization is generally desirable in the main pole 204/204'. Further, the thickness of the nonmagnetic gap layer 208/208' may be better controlled. Thus, performance of the transducer 200/200' and head 250 may be improved.

Figure 6:
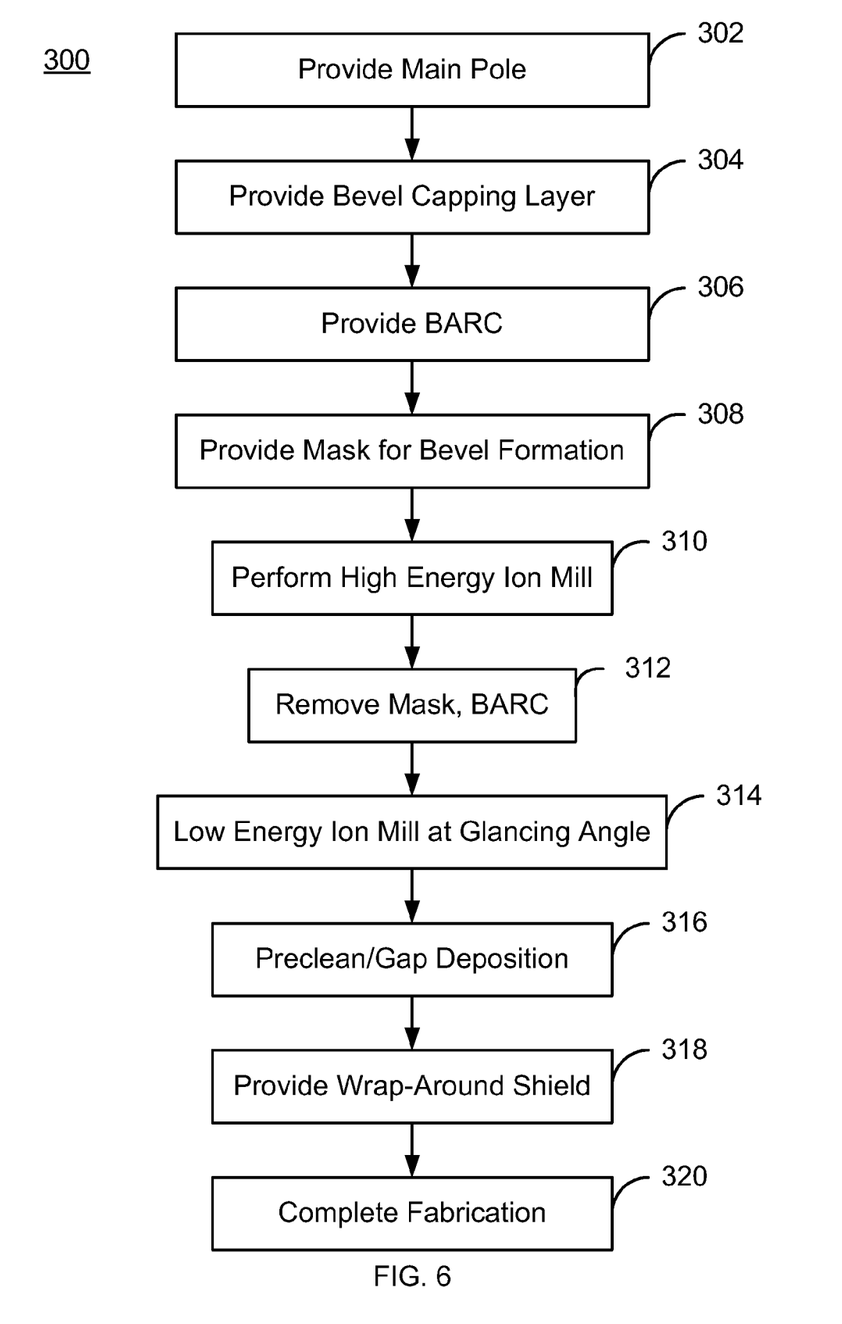
FIG. 6 is a flow chart depicting another exemplary embodiment of a method for fabricating a PMR transducer.

FIG. 6 is a flow chart depicting another exemplary embodiment of a method 300 for fabricating a transducer, such as a PMR transducer. For simplicity, some steps may be omitted. FIGS. 7-13 are diagrams depicting side views of an exemplary embodiment of a portion of a transducer 400 during fabrication. For clarity, FIGS. 7-13 are not to scale. Further, although FIGS. 7-13 depict the ABS location at a particular point in the pole, other embodiments may have other locations for the ABS. Structures in FIGS. 7-13 are shown as terminating at the ABS. During fabrication, at least a portion of such structures typically extend beyond the ABS. The portions of the structures extending beyond the ABS location are generally removed later in fabrication, for example by lapping the transducer 400. However, for simplicity, the transducer 400 is only shown as extending to the ABS location. Referring to FIGS. 6-13, the method 300 is described in the context of the transducer 400. However, the method 300 may be used to form another device (not shown). The transducer 400 being fabricated may be part of a merged head that also includes a read head (not shown in FIGS. 7-13) and resides on a slider (not shown) in a disk drive. The method 300 also may commence after formation of other portions of the transducer 400. The method 300 is also described in the context of providing a single transducer 400 and a single pole. However, the method 300 may be used to fabricate multiple transducers and/or multiple poles at substantially the same time. The method 300 and device 400 are also described in the context of particular layers. However, in some embodiments, such layers may include multiple sublayers.

A main pole bottom is provided, via step 302. Step 302 is analogous to step 102 of the method 100. The main pole may be a PMR pole. Thus, the top of the main pole may be wider than the bottom. In addition, step 102 may include forming a leading edge bevel. Thus, the region of the main pole at the ABS may be shorter than a portion of the main pole distal from the ABS. Step 102 may be performed by depositing a layer, providing a trench having the desired profile in the layer and depositing the material(s) for the pole in the trench. For example, the pole material(s) may be electroplated. Alternatively, the magnetic and other material(s) for the pole may be deposited and a portion of the material(s) removed to form the pole. The main is generally includes pole material(s) that are alloys including Co, Fe, and/or Ni with a high magnetic moment.

Figure 7:
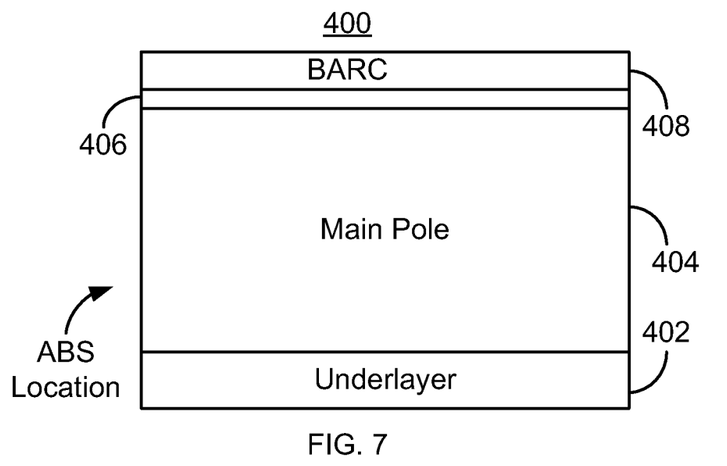
FIGS. 7-13 are diagrams depicting an exemplary embodiment of a PMR transducer during fabrication.

A bevel capping layer may be provided on top of the main pole, via step 304. A bottom antireflective coating (BARC) may also be provided on the bevel capping layer, via step 304. The BARC is used to reduce reflections during subsequent photolithographic processing. FIG. 7 depicts the transducer 400 after step 304 is performed. Thus, an underlayer 402 and main pole 404 on the underlayer 402 are shown. Proximate to the ABS location, the underlayer 402 may be nonmagnetic. However, distal from the ABS, the main pole 404 may reside on another pole, as depicted in FIG. 5. Referring back to FIGS. 6-13, also shown are the bevel capping layer 406 and BARC 408. The bevel capping layer 406 is nonmagnetic and may include materials such as aluminum oxide, silicon oxide, a silicon nitride, and/or nonmagnetic metals such as Ru, Ta, and/or Cr. The bevel capping layer 406 may be used to protect the top of the main pole 404 during subsequent processing steps, such as lift-off and a reactive ion etch (RIE). The bevel capping layer may also allow tailoring of the field gradient from the main pole 404. The BARC layer 404 may include materials such as diamond-like carbon (DLC), silicon nitride, and/or an organic antireflective coating. However, other materials might be used for the bevel capping layer 406 and/or the BARC 408.

Figure 8:
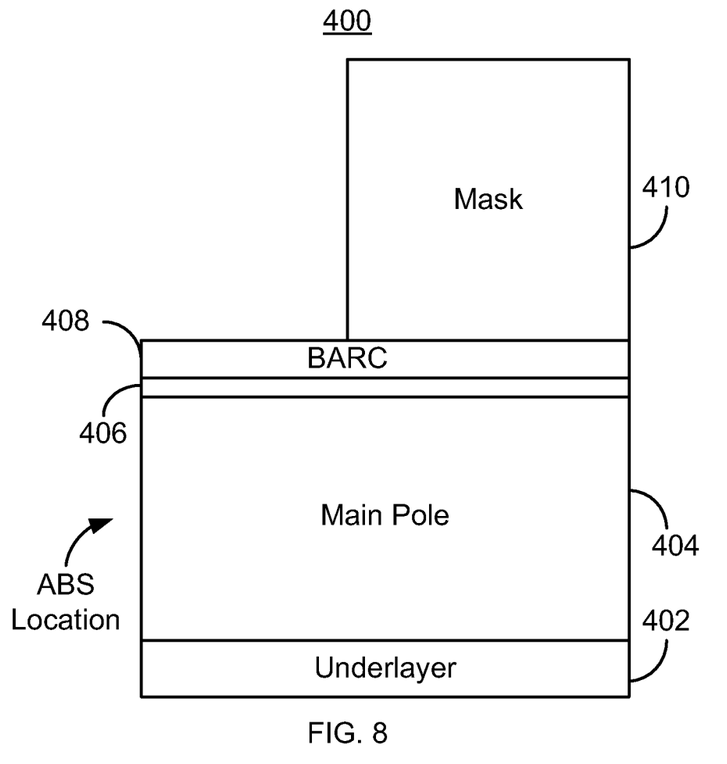

A mask is provided on the BARC distal from the ABS location, via step 308. The mask may be a photoresist mask. Thus, step 308 may include depositing the photoresist, then patterning the photoresist using photolithographic techniques. In other embodiments, the mask may be a hard mask such as DLC or aluminum oxide. In such embodiments, the hard mask is patterned as part of step 308. FIG. 8 depicts the transducer 400 after step 308 is performed. Thus, the mask 410 has been provided. As can be seen in FIG. 8, a portion of the main pole 404, bevel capping layer 406, and BARC 408 proximate to the ABS location are exposed by the mask 410. The height and distance of the mask 410 from the ABS location are desired to be determined based upon characteristics of the bevel to be formed. More specifically, the mask 410 is desired not to adversely affect the ion mill of step 310, discussed below.

Figure 9:
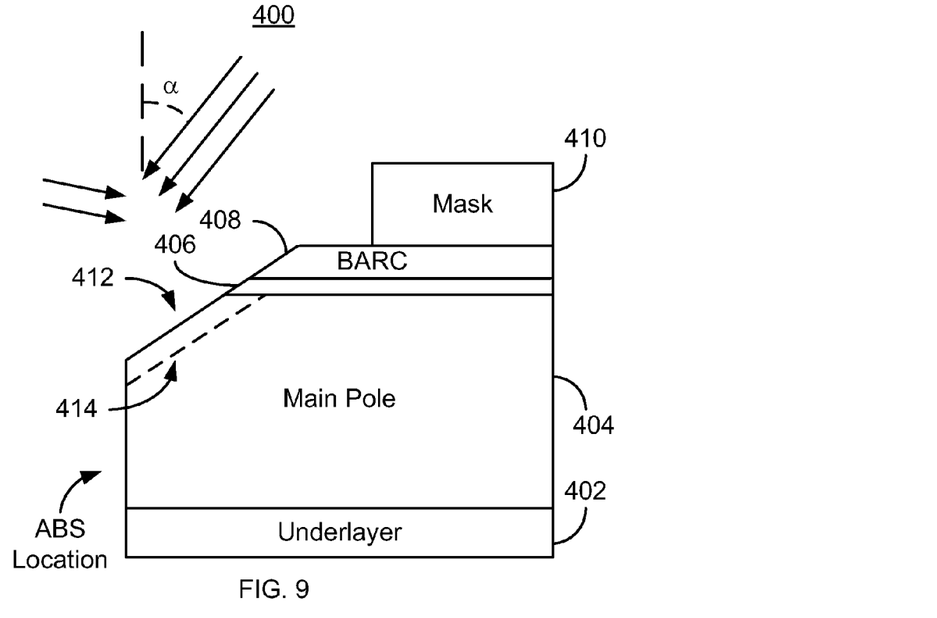

After the mask is provided, a high energy ion mill is performed at an angle from a normal to the top of the main pole, via step 310. In some embodiments, the high energy ion mill is at an energy of at least five hundred eV. In other embodiments, the high energy ion mill is at an energy of at least seven hundred eV. FIG. 9 depicts the transducer 400 during step 310. The high energy ion mill is performed at an angle, α, from normal to the top surface of the main pole 404. The angle α is at least thirty-five degrees and not more than fifty-five degrees. In some embodiments, the angle α is at least forty and not more than fifty degrees. This high energy ion mill is a backside ion mill. Thus, the angle α is such that the ions approach the ABS from the back side of the transducer 400, distal from the ABS. Also shown in FIG. 9 is a front side ion mill that may optionally be performed as part of the high energy ion mill. The front and back side ion mills may be interspersed so that the high energy ion mill of step 310 is a combination of one or more front and back side ion mills. The front side ion mills may be at the same energy as the back side ion mill, but may be carried out for only a small portion of the time. The front side ion mills may be used to remove redeposition on from the ion mill. As can be seen in FIG. 9, a portion of the top of the main pole 404, a portion of the BARC 408, and a portion of the bevel capping layer 406 proximate to the ABS are removed. In addition, a portion of the mask 410 is also consumed. In some embodiments, all of the mask 410 may be removed during the ion milling of step 310. It is believed that consumption of the mask 410 may be desirable because a more level bevel surface 412 may be achieved. However, consumption of the mask 410 is not required. The high energy ion mill of step 310 also exposes a top bevel surface 412 of the main pole 404. The top bevel surface 412 and corresponding bevel are both denoted by the numeral 412. Also shown in FIG. 9 is the damaged region 414 due to the high energy ion mill. In general, the damaged region 414 is amorphous and at least twenty-six Angstroms thick.

Figure 10:
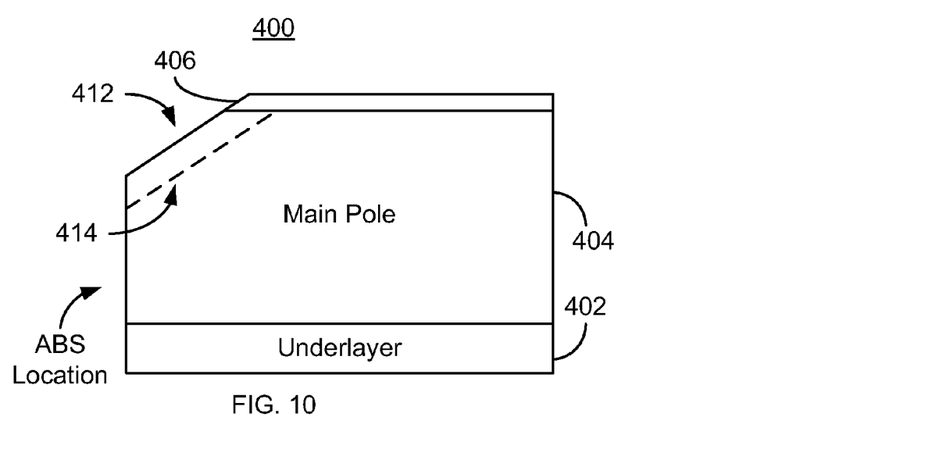

Any remaining portion of the mask 410 is removed after the high energy ion mill, via step 312. Step 312 may also include removing the BARC layer. For example, a lift-off may be performed for the mask 410 and BARC 408. In addition, an oxygen RIE and Eco-snow process may be performed to remove any fencing (not shown). In such embodiments, additional damage may be done to the bevel surface 412. For example, in some embodiments, the thickness of the damaged region may increase to thirty eight through forty-three Angstroms. FIG. 10 depicts the transducer after step 312 is performed. Thus, the bevel cap 406 is exposed. In addition, although shown as unchanged, the damaged region 414 may be thicker.

Figure 11:
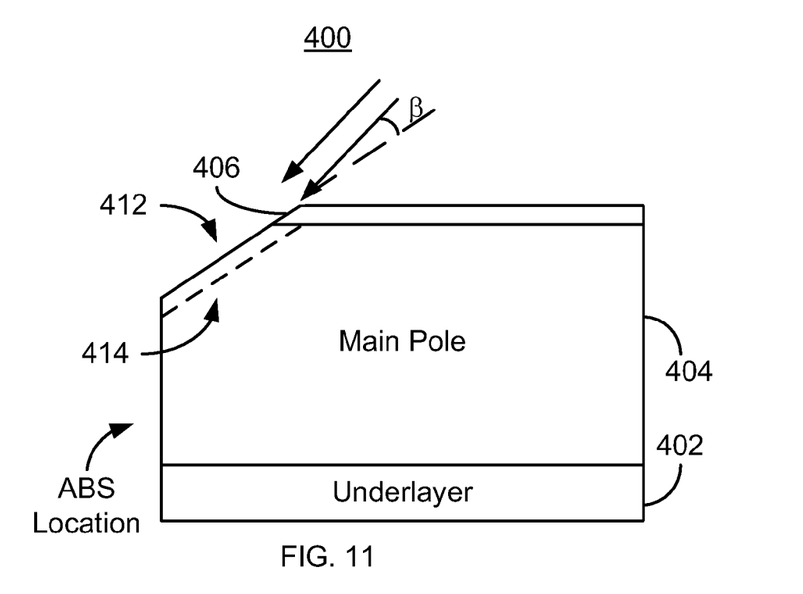

A low energy ion mill is performed at an energy lower than the high energy ion mill and at a glancing angle from the top bevel surface 412, via step 314. The energy of the low energy ion mill may be at least three hundred eV less than the energy of the high energy ion mill. In some embodiments, the energy is less than or equal to two hundred and fifty eV. In other embodiments, the energy does not exceed two hundred eV. In some such embodiments, the energy is not more than one hundred eV. FIG. 11 depicts the transducer 400 during the low energy ion mill of step 314. The low energy ion mill is performed at a glancing angle, $\beta$, from the bevel surface 412. In some embodiments, $\beta$ is at least ten and not more than fifteen degrees. Further, as can be seen in FIG. 11, the low energy ion mill is a back side ion mill. A substantial portion of the damaged region 414 may be removed. For example, in some embodiments, the thickness of the damaged region 414 after step 314 may be on the order of nineteen through twenty-one Angstroms. In some embodiments, the thickness of the damaged region 414 is less than twenty Angstroms after the low energy ion mill of step 314.

Figure 12:
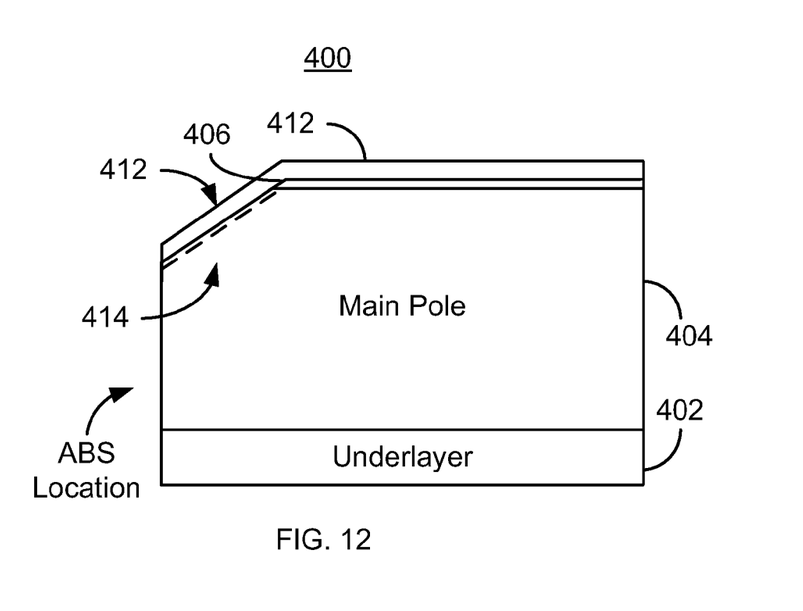

A nonmagnetic gap is provided, via step 316. Step 316 generally includes performing a preclean, such as a sputter etch. Once the preclean is performed, nonmagnetic, write gap may then be deposited. The nonmagnetic gap may be insulating or conductive. For example, the nonmagnetic gap may include aluminum oxide and may be deposited via ALD. FIG. 12 depicts the transducer 400 after step 316. In addition to preparing the surface for the nonmagnetic gap, the preclean has removed some additional damage due to the high energy ion mill and possibly other processing. In some embodiments, the damaged region 414 is not more than twenty Angstroms thick. In other embodiments, the damaged region 414 may be not more than fifteen Angstroms thick after step 316. Further, nonmagnetic gap 412 has been provided.

Figure 13:
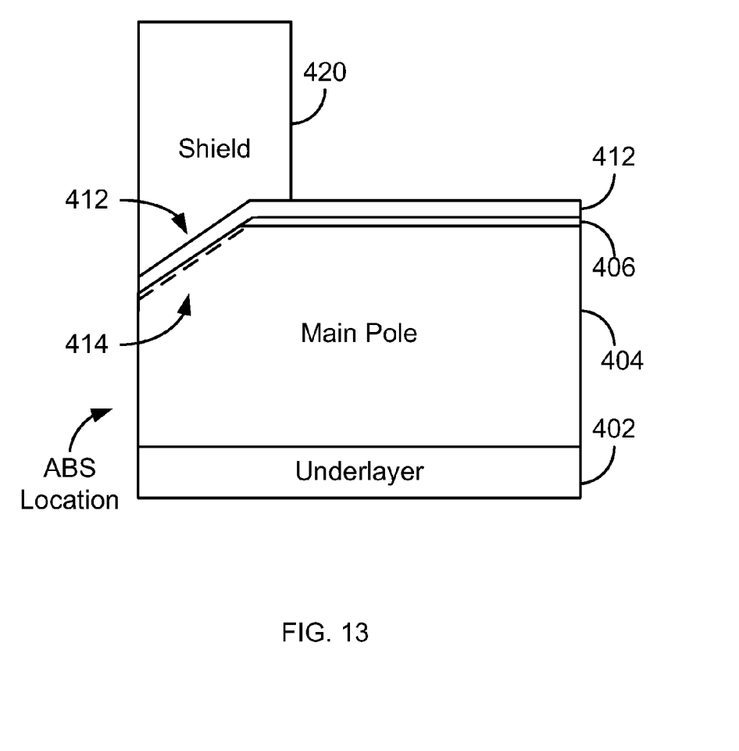

A wrap-around shield may also be provided, via step 318. Step 318 may include a preclean and deposition of seed layer(s) for the wrap-around shield. The wrap-around shield may be electroplated or deposited in another manner. FIG. 13 depicts the transducer 400 after step 318 is performed. Consequently, shield 420 is shown. Subsequent processing may then be performed, via step 320. Thus, insulating layer(s), coils, shields, and/or other features may be fabricated.

Using the method 300, improvements in the performance and manufacturing of the transducer 400 may be achieved. In some embodiments, the thickness of the damaged, amorphous region 414 may not exceed twenty Angstroms in the final device. In some embodiments, the thickness of the damaged region 414 in the final device is not more than fifteen Angstroms. Because the damaged region 414 is thinner, reductions in the saturation magnetization of the main pole 404 due to the damaged region 414 maybe ameliorated. Such a higher saturation magnetization is generally desirable in the main pole 404. Further, the thickness of the nonmagnetic gap layer 406 may be better controlled. Thus, performance of the transducer 400 may be improved.

We claim:

1. A magnetic recording transducer having an air-bearing surface (ABS) comprising:
    a main pole having a bottom, a top wider than the bottom, and a top bevel proximate to the ABS;
    an amorphous layer on the top bevel and having a thickness of less than twenty Angstroms;
    a nonmagnetic gap, at least a portion of the nonmagnetic gap residing on the top bevel; and
    a wrap-around shield on the nonmagnetic gap.

2. The magnetic recording transducer of claim 1 wherein the amorphous layer is not more than fifteen Angstroms thick.

3. The magnetic recording transducer of claim 1 wherein the top bevel surface is configured such that a distance between the top and the bottom of the main pole is smallest at the ABS.

\* \* \* \* \*